US012810846B2

(12) United States Patent
Babaev et al.

(10) Patent No.: US 12,810,846 B2
(45) Date of Patent: Nov. 24, 2026

(54) ELECTRONIC DEVICE AND METHOD OF LOW LATENCY SPEECH ENHANCEMENT USING AUTOREGRESSIVE CONDITIONING-BASED NEURAL NETWORK MODEL

(71) Applicant: SAMSUNG ELECTRONICS CO., LTD., Suwon-si (KR)

(72) Inventors: Nikolas Andrew Babaev, Moscow (RU); Pavel Konstantinovich Andreev, Moscow (RU); Azat Rustamovich Saginbaev, Moscow (RU); Ivan Sergeevich Shchekotov, Moscow (RU)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 106 days.

(21) Appl. No.: 18/416,589

(22) Filed: Jan. 18, 2024

(65) Prior Publication Data

US 2024/0161736 A1 May 16, 2024

Related U.S. Application Data

(63) Continuation of application No. PCT/KR2023/015526, filed on Oct. 10, 2023.

(30) Foreign Application Priority Data

Oct. 10, 2022 (RU) ........................... RU2022126347
Jan. 10, 2023 (RU) ........................... RU2023100152

(51) Int. Cl.
*G10L 15/18* (2013.01)
*G10L 15/06* (2013.01)

(52) U.S. Cl.
CPC ............ *G10L 15/18* (2013.01); *G10L 15/063* (2013.01)

(58) Field of Classification Search
CPC ... G10L 15/18; G10L 15/063; G10L 21/0224; G10L 21/02; G06N 3/044; G06N 3/045; G06N 3/08; G06N 3/084; G06N 3/02
See application file for complete search history.

(56) References Cited

U.S. PATENT DOCUMENTS 6,169,981 B1 * 1/2001 Werbos .............. G05B 13/0285 706/26
10,554,738 B1 * 2/2020 Ren ..................... G06F 11/3442
(Continued)

FOREIGN PATENT DOCUMENTS

| | | | |
|---|---|---|---|
| CN | 112634174 | A | 4/2021 |
| RU | 2517315 | C2 | 5/2014 |
| WO | 2011/027337 | A1 | 3/2011 |

OTHER PUBLICATIONS

SN Graetzer, Jon Barker, Trevor J Cox, Michael Akeroyd, John F Culling, Graham Naylor, Eszter Porter, R Viveros Munoz, et al., "Clarity—2021 challenges: Machine learning challenges for advancing hearing aid processing," in Proceedings of the Annual Conference of the International Speech Communication Association, Interspeech. International Speech Communication Association (ISCA), 2021, vol. 2, pp. 686-690.
(Continued)

*Primary Examiner* — Michael Colucci
(74) *Attorney, Agent, or Firm* — Sughrue Mion, PLLC

(57) ABSTRACT

A neural method model is trained by, in an initial training iteration, training the neural network model in a teacher forcing mode in which an autoregressive channel includes a ground-truth shifted waveform, and outputting predictions of the neural network model; and in at least one additional training iteration, replacing the ground-truth shifted waveform in the autoregressive channel with the predictions of the neural network model obtained in a previous training iteration. An inference may then be performed by providing,
(Continued)

for the neural network model, an additional channel containing at least one prediction of the neural network model outputted during training; and performing speech enhancement using the neural network model.

15 Claims, 3 Drawing Sheets

(56) References Cited

U.S. PATENT DOCUMENTS

| | | | | |
|---|---|---|---|---|
| 11,295,725 | B2 | 4/2022 | Sharma et al. | |
| 11,444,338 | B1 * | 9/2022 | Dhawan | H01M 50/569 |
| 11,481,210 | B2 | 10/2022 | Singh et al. | |
| 11,482,207 | B2 | 10/2022 | Ping et al. | |
| 11,501,169 | B1 * | 11/2022 | Schubert | G06N 3/0455 |
| 2006/0265218 | A1 | 11/2006 | Samadani | |
| 2017/0011738 | A1 | 1/2017 | Senior et al. | |
| 2017/0372201 | A1 * | 12/2017 | Gupta | G06N 3/084 |
| 2018/0176232 | A1 * | 6/2018 | Rodriguez | H04L 61/4511 |
| 2019/0043489 | A1 | 2/2019 | Lopatka et al. | |
| 2019/0043516 | A1 | 2/2019 | Germain et al. | |
| 2019/0180732 | A1 * | 6/2019 | Ping | G06F 9/30003 |
| 2020/0327225 | A1 * | 10/2020 | Nguyen | G06N 3/08 |
| 2020/0402497 | A1 * | 12/2020 | Semenov | G06N 3/045 |
| 2021/0183401 | A1 * | 6/2021 | Narayanaswamy | G06N 3/08 |
| 2021/0232928 | A1 * | 7/2021 | Farrahi Moghaddam | G06F 18/214 |
| 2022/0004876 | A1 * | 1/2022 | Karg | G06N 3/063 |
| 2022/0012309 | A1 * | 1/2022 | Shachar | G06N 3/084 |
| 2022/0012502 | A1 * | 1/2022 | Klinkigt | G06N 3/08 |
| 2022/0058803 | A1 * | 2/2022 | Bhattacharya | A61B 3/102 |
| 2022/0059117 | A1 * | 2/2022 | Shor | G06N 5/046 |
| 2022/0067534 | A1 | 3/2022 | Bai et al. | |
| 2022/0108712 | A1 * | 4/2022 | Song | G10L 21/0208 |
| 2022/0122582 | A1 * | 4/2022 | Elias | G10L 13/08 |
| 2022/0253685 | A1 * | 8/2022 | Ozcan | G06N 3/084 |
| 2022/0254330 | A1 * | 8/2022 | Cobo Rus | G10L 13/047 |
| 2022/0293083 | A1 * | 9/2022 | Shechtman | G10L 13/02 |
| 2022/0309651 | A1 | 9/2022 | Zheng et al. | |
| 2022/0343399 | A1 * | 10/2022 | Filipovich | G06Q 10/00 |
| 2023/0072731 | A1 * | 3/2023 | Li | G01S 7/4808 |
| 2023/0245303 | A1 * | 8/2023 | Miller | G06N 3/0455 382/128 |
| 2023/0334245 | A1 * | 10/2023 | Kumar Choubey | G06F 16/35 |
| 2023/0342787 | A1 * | 10/2023 | Mohanty | G06N 20/00 |
| 2023/0394296 | A1 * | 12/2023 | Tan | G06N 3/09 |

OTHER PUBLICATIONS

Alexandre Defossez, Gabriel Synnaeve, and Yossi Adi, "Real time speech enhancement in the waveform domain," arXiv:2006.12847, Jun. 23, 2020, 5 pages.

Xiang Hao, Xiangdong Su, Radu Horaud, and Xiaofei Li, "Fullsubnet: A full-band and sub-band fusion model for real-time single-channel speech enhancement," in ICASSP 2021-2021 IEEE International Conference on Acoustics, Speech and Signal Processing (ICASSP), IEEE, Jun. 2021, 6 pages.

Umut Isik, Ritwik Giri, Neerad Phansalkar, Jean-Marc Valin, Karim Helwani, and Arvindh Krishnaswamy, "Poconet: Better speech enhancement with frequency-positional embeddings, semi-supervised conversational data, and biased loss," arXiv:2008.04470v1, Aug. 11, 2020, 5 pages.

Zehai Tu, Jisi Zhang, Ning Ma, and Jon Barker, "A twostage end-to-end system for speech-in-noise hearing aid processing," Proc. Clarity, pp. 3-5, 2021.

K Zmolikova and JH Cernock, "BUT system for the first clarity enhancement challenge," Proceedings of Clarity, pp. 1-3, 2021.

Tom Gajecki andWaldo Nogueira, "Binaural speech enhancement based on deep attention layers," Proc. Clarity, pp. 6-8, 2021.

M Luo and Nima Mesgarani, "Conv-tasnet: Surpassing ideal time-frequency magnitude masking for speech separation," IEEE/ACM transactions on audio, speech and language processing, vol. 27, No. 8, arXiv:1809.07454v3, May 15, 2019, 12 pages.

Shanshan Wang, Gaurav Naithani, Archontis Politis, and Tuomas Virtanen, "Deep neural network based lowlatency speech separation with asymmetric analysissynthesis window pair," in 2021 29th European Signal Processing Conference (EUSIPCO). IEEE, arXiv:2106.11794v1, Jun. 22, 2021, pp. 301-305.

Zhong-Qiu Wang, Gordon Wichern, Shinji Watanabe, and Jonathan Le Roux, "STFT-domain neural speech enhancement with very low algorithmic latency," arXiv:2204.09911v1, Apr. 21, 2022, 11 pages.

Tom Brown, Benjamin Mann, Nick Ryder, Melanie Subbiah, Jared D Kaplan, Prafulla Dhariwal, Arvind Neelakantan, Pranav Shyam, Girish Sastry, Amanda Askell, et al., "Language models are few-shot learners," Advances in neural information processing systems, vol. 33, pp. 1877-1901, 2020.

Jacob Devlin, Ming-Wei Chang, Kenton Lee, and Kristina Toutanova, "BERT: Pre-training of deep bidirectional transformers for language understanding," arXiv:1810.04805v1, Oct. 11, 2018, 14 pages.

Jonathan Shen, Ruoming Pang, Ron J Weiss, Mike Schuster, Navdeep Jaitly, Zongheng Yang, Zhifeng Chen, Yu Zhang, Yuxuan Wang, Rj Skerrv-Ryan, et al., "Natural TTS synthesis by conditioning wavenet on mel spectrogram predictions," in 2018 IEEE international conference on acoustics, speech and signal processing (ICASSP). IEEE, arXiv:1712.05884v2, Feb. 16, 2018, pp. 4779-4783.

Jonathan Shen, Ye Jia, Mike Chrzanowski, Yu Zhang, Isaac Elias, Heiga Zen, and YonghuiWu, "Non-attentive tacotron: Robust and controllable neural TTS synthesis including unsupervised duration modeling," arXiv:2010.04301v1, Oct. 8, 2020, 13 pages.

Aaron Van den Oord, Nal Kalchbrenner, Lasse Espeholt, Oriol Vinyals, Alex Graves, et al., "Conditional image generation with pixelCNN decoders," Advances in neural information processing systems, vol. 29, 2016, 9 pages.

Mark Chen, Alec Radford, Rewon Child, Jeffrey Wu, Heewoo Jun, David Luan, and Ilya Sutskever, "Generative pretraining from pixels," in International conference on machine learning, PMLR, 2020, pp. 1691-1703.

Aaron van den Oord, Sander Dieleman, Heiga Zen, Karen Simonyan, Oriol Vinyals, Alex Graves, Nal Kalchbrenner, Andrew Senior, and Koray Kavukcuoglu, "Wavenet: A generative model for raw audio," arXiv:1609.03499v1, Sep. 12, 2016, 15 pages.

Nal Kalchbrenner, Erich Elsen, Karen Simonyan, Seb Noury, Norman Casagrande, Edward Lockhart, Florian Stimberg, Aaron Oord, Sander Dieleman, and Koray Kavukcuoglu, "Efficient neural audio synthesis," in International Conference on Machine Learning, PMLR, 2018, pp. 2410-2419.

Ravichander Vipperla, Sangjun Park, Kihyun Choo, Samin Ishtiaq, Kyoungbo Min, Sourav Bhattacharya, Abhinav Mehrotra, Alberto Gil CP Ramos, and Nicholas D Lane, "Bunched lpcnet: Vocoder for lowcost neural text-to-speech systems," arXiv:2008.04574v1, Aug. 11, 2020, 5 pages.

Max Morrison, Rithesh Kumar, Kundan Kumar, Prem Seetharaman, Aaron Courville, and Yoshua Bengio, "Chunked autoregressive gan for conditional waveform synthesis," arXiv:2110.10139v1, Oct. 19, 2021, 18 pages.

Ronald J Williams and David Zipser, "A learning algorithm for continually running fully recurrent neural networks," Neural computation, vol. 1, No. 2, pp. 270-280, 1989.

Olaf Ronneberger, Philipp Fischer, and Thomas Brox, "U-net: Convolutional networks for biomedical image segmentation," in International Conference on Medical image computing and computer-assisted intervention, Springer, 2015, pp. 234-241.

Daniel Stoller, Sebastian Ewert, and Simon Dixon, "Wave-u-net: A multi-scale neural network for endto-end audio source separation," arXiv:1806.03185v1, Jun. 8, 2018, 7 pages.

Tom Le Paine, Pooya Khorrami, Shiyu Chang, Yang Zhang, Prajit Ramachandran, Mark A Hasegawa-Johnson, and Thomas S Huang, "Fast wavenet generation algorithm," arXiv:1611.09482v1, Nov. 29, 2016, 6 pages.

Samy Bengio, Oriol Vinyals, Navdeep Jaitly, and Noam Shazeer, "Scheduled sampling for sequence prediction with recurrent neural networks," Advances in neural information processing systems, vol. 28, 2015, 9 pages.

(56) References Cited

OTHER PUBLICATIONS

AlexMLamb, Anirudh Goyal Alias Parth Goyal, Ying Zhang, Saizheng Zhang, Aaron C Courville, and Yoshua Bengio, "Professor forcing: A new algorithm for training recurrent networks," Advances in neural information processing systems, vol. 29, 2016, 9 pages.
Qingyun Dou, Joshua Efiong, and Mark JF Gales, "Attention forcing for speech synthesis," in Interspeech 2020, Oct. 25-29, 2020, pp. 4014-4018.
Communication issued Jul. 26, 2023 by the Russian Patent Office for Russian Patent Application No. 2023100152.
International Search Report (PCT/ISA/210) dated Feb. 5, 2024, issued by the International Searching Authority in International Application No. PCT/KR2023/015526.
Written Opinion (PCT/ISA/237) dated Feb. 5, 2024, issued by the International Searching Authority in International Application No. PCT/KR2023/015526.
Fan et al., "PointRNN: Point Recurrent Neural Network for Moving Point Cloud Processing," arXiv:1910.08287v2 [cs.CV] Nov. 24, 2019, total 16 pages.
Liu et al., "Confidence-Aware Scheduled Sampling for Neural Machine Translation," arXiv:2107.10427v1 [cs.CL], Jul. 2021, total 13 pages.
Communication dated Sep. 5, 2025, issued by the European Patent Office in European Application No. 23877626.4.
Craig Macartney et al: "Improved Speech Enhancement with the Wave-U-Net", Cornell University Library, 201 Olin Library Cornell University Ithaca, NY, 14853, Nov. 2018, XP080939744, arXiv:1811.11307v1 [cs.SD], Total 5 pages.
Communication dated May 21, 2026, issued by the European Patent Office in European Application No. 23877626.4.

* cited by examiner

ELECTRONIC DEVICE AND METHOD OF LOW LATENCY SPEECH ENHANCEMENT USING AUTOREGRESSIVE CONDITIONING-BASED NEURAL NETWORK MODEL

CROSS-REFERENCE TO RELATED APPLICATIONS

This application is a continuation of International Application No. PCT/KR2023/015526, filed on Oct. 10, 2023, which claims priority to Russian Patent Application No. 2022126347, filed on Oct. 10, 2022, in the Russian Agency for Patents and Trademarks, and Russian Patent Application No. 2023100152 filed on Jan. 10, 2023, in the Russian Agency for Patents and Trademarks, the disclosures of which are incorporated by reference herein in their entireties.

BACKGROUND

1. Field

The disclosure relates to the field of computing, in particular to methods for processing and analyzing audio recordings.

2. Description of Related Art

The problem of real-time streaming ("live") speech processing has great practical importance for modern digital hearing aids, acoustically transparent hearing devices, and telecommunication. Undetectable limits to lag for live, real-time processing is a subject of investigation and debate, but is estimated around 5-30 milliseconds depending on application. Taking into consideration that speech enhancement tools are usually deployed in joint pipelines with other speech processing tools (e.g., echo cancellation) and within signal transmission channels, requirements for total delay are very strict and, for many applications, are hardly met by mainstream speech enhancement solutions which typically rely on more than 30-60 ms algorithmic (by model design) latency. To address this, Defossez et al., "Real time speech enhancement in the waveform domain" [4] proposes a convolutional architecture with an LSTM (Long Short-term Memory) layer for real-time streaming processing. However, this architecture still suffers more than 15 ms algorithmic latency. Therefore, there is a significant demand for research devoted to low-latency (less than 10 ms) speech enhancement models.

Low latency speech enhancement has recently attracted significant attention of research community. Time-domain causal neural architectures have been explored for this task, because spectral domain methods tend to be limited by window size of short-time Fourier transform, which is typically chosen to be longer than 20-30 ms. More recent works argue that it is also possible to utilize time-frequency domain architectures by using asymmetric analysis-synthesis pairs for windows of a direct short-time Fourier transform and its inverse.

SUMMARY

Provided are an electronic device and method of low latency speech enhancement using autoregressive conditioning-based neural network model.

In accordance with an aspect of the disclosure, a method of training and operating a neural network model, includes: in an initial training iteration, training the neural network model in a teacher forcing mode in which an autoregressive channel includes a ground-truth shifted waveform, and outputting predictions of the neural network model; and, in at least one additional training iteration, replacing the ground-truth shifted waveform in the autoregressive channel with the predictions of the neural network model obtained in a previous training iteration.

In accordance with an aspect of the disclosure, an electronic device includes at least one memory storing at least one instruction; and at least one processor. The at least one processor configured to execute the at least one instruction to, in an initial training iteration, train the neural network model in a teacher forcing mode in which an autoregressive channel includes a ground-truth shifted waveform, and output predictions of the neural network model; and, in at least one additional training iteration, replace the ground-truth shifted waveform in the autoregressive channel with the predictions of the neural network model obtained a previous training iteration.

In accordance with an aspect of the disclosure, a non-transitory computer-readable medium stores instructions stored which, when executed by at least one processor, cause the at least one processor to, in an initial training iteration, train the neural network model in a teacher forcing mode in which an autoregressive channel includes a ground-truth shifted waveform, and output predictions of the neural network model; and, in at least one additional training iteration, replace the ground-truth shifted waveform in the autoregressive channel with the predictions of the neural network model obtained a previous training iteration.

BRIEF DESCRIPTION OF THE DRAWINGS

The above and other features and advantages of certain embodiments of the disclosure are explained in the following description taken in conjunction with the accompanying drawings, in which.

DETAILED DESCRIPTION

Figure 1:
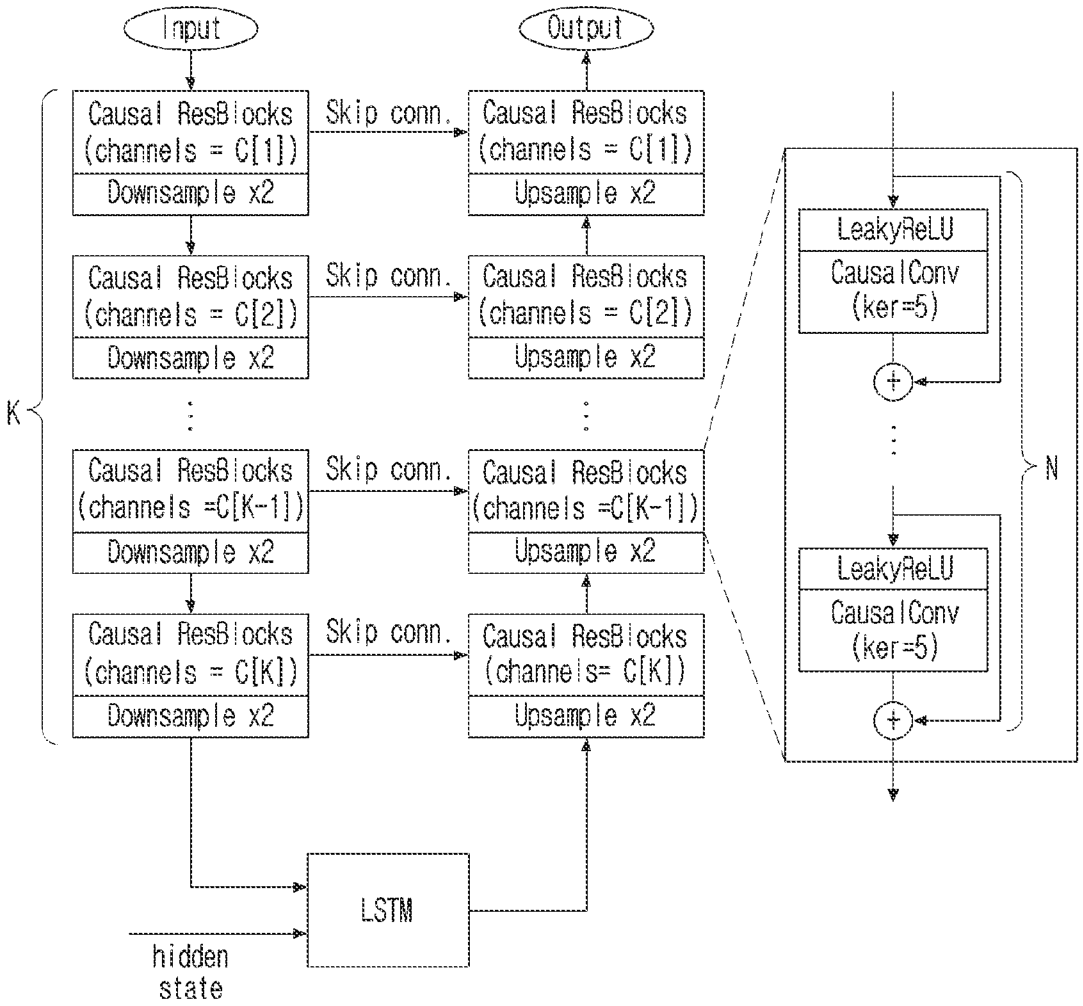
FIG. 1 is a block diagram illustrating an example architecture for a neural network model, according to an embodiment of the disclosure.

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain example embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed herein, these combinations are not intended to limit the disclosure of possible implementations. In fact, many of these features may be combined in ways not specifically recited in the claims and/or disclosed herein. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Streaming speech processing may be performed by processing discrete "chunks" of waveform samples in a sequential manner. The chunk size and total future context used for its processing determines algorithmic latency, which may be defined as a total latency produced due to algorithmic reasons. Algorithmic latency may be also defined as the maximum duration of future context needed for producing each time step of the processed waveform. In contrast, hardware latency may be defined as latency imposed by a duration of hardware computations. Total latency is a sum of algorithmic latency and hardware latency. Algorithmic latency imposes principal constraints on total latency, while hardware latency can be reduced by manipulation of model size and hardware efficiency. The present disclosure primarily discusses improvements to algorithmic latency.

An autoregressive model is a form of generative model employed for various applications, including but not limited to language modeling, text-to-speech translation, and image generation. For example, autoregressive models applied to conditional waveform generation are used in neural vocoding. One example is a fully convolutional autoregressive model that produces highly realistic speech samples conditioned on linguistic features, utilizing causal dilated convolutions to model waveform sequences. Dilated convolutions help to increase the receptive field of the model, while causality enables generation of samples in a sequential (autoregressive) manner. In one or more embodiments of the present disclosure, causal convolutions are similarly used for autoregressive conditional generation, but using a very different type of conditional information (a degraded waveform), and using waveform samples which are generated by chunks instead of one-by-one.

The CARGAN model combines autoregressive conditioning with the power of generative adversarial networks to mitigate artifacts during spectrogram inversion. In one or more embodiments of the present disclosure, autoregressive conditioning is similarly combined with adversarial training, but in consideration of different tasks and employing much smaller chunk sizes (<10 ms compared to 92 ms employed in the CARGAN model.

Teacher forcing is a training process for autoregressive models, although originally proposed for training of recurrent neural networks. The approach provides a model with previous ground-truth samples during training, then learning to predict the next sample. At the inference stage, the model uses its own samples for autoregressive conditioning (free running mode), since ground-truth is not available. The present inventors have found that usage of ground-truth samples (teacher forcing) greatly improves speech enhancement quality in a training regime (see row 300GT of Table 1, below). However, models trained with teacher forcing display unsatisfactory results (see row 300honest of Table 1, below) during inference, due to training-inference mismatch. One of the most characteristic artifacts that the present inventors have observed are the regions of silence that appear in the predicted waveform. The model seems to heavily rely on ground-truth conditioning, to detect regions of speech and silence.

TABLE 1

Results. Models with our proposed autoregressive conditioning are denoted as AR.

| Model | UTMOS | MosNET | PESQ | DNSMOS | STOI | SISDR | SNR |
|---|---|---|---|---|---|---|---|
| Motivation | | | | | | | |
| baseline | 3.53 | 4.23 | 2.38 | 2.97 | 0.83 | 17.03 | 17.029 |
| 300GT | 3.57 | 4.34 | 2.69 | 3.021 | 0.86 | 22.052 | 21.935 |
| 300honest | 3.384 | 4.037 | 2.142 | 2.926 | 0.708 | 12.66 | 14.21 |
| AR | 3.611 | 4.38 | 2.36 | 3.03 | 0.84 | 18.404 | 18.373 |
| Loss variety | | | | | | | |
| adv + 11spec | 3.684 | 4.258 | 2.592 | 3.019 | 0.8347 | 15.197 | 15.196 |
| AR + adv + 11rspec | 3.741 | 4.292 | 2.567 | 3.044 | 0.8365 | 15.27 | 15.163 |
| sisnr | 3.514 | 4.193 | 2.381 | 2.958 | 0.8325 | 16.965 | 16.988 |
| AR + sisnr | 3.566 | 4.206 | 2.445 | 2.964 | 0.8384 | 17.784 | 17.79 |

TABLE 1-continued

Results. Models with our proposed autoregressive conditioning are denoted as AR.

| Model | UTMOS | MosNET | PESQ | DNSMOS | STOI | SISDR | SNR |
|---|---|---|---|---|---|---|---|
| Dataset variety | | | | | | | |
| 11raw + dns | 2.417 | 2.927 | 2.052 | 2.793 | 0.7918 | 14.514 | 14.429 |
| AR + llraw + dns | 2.472 | 2.973 | 2.056 | 2.861 | 0.7916 | 14.625 | 14.758 |
| Architecture variety | | | | | | | |
| cwu | 3.536 | 4.244 | 2.401 | 2.978 | 0.8312 | 17.184 | 17.168 |
| AR + cwu | 3.61 | 4.38 | 2.361 | 3.034 | 0.8366 | 18.404 | 18.373 |
| ctn | 3.083 | 3.729 | 2.036 | 2.858 | 0.8002 | 15.277 | 10.97 |
| AR + ctn | 3.328 | 4.208 | 1.967 | 2.991 | 0.778 | 15.796 | 15.941 |
| Latency | | | | | | | |
| 32 | 3.475 | 4.235 | 2.315 | 2.938 | 0.8317 | 17.149 | 17.109 |
| AR + 32 | 3.546 | 4.29 | 2.261 | 2.979 | 0.8378 | 18.25 | 18.204 |
| 64 | 3.503 | 4.274 | 2.349 | 2.961 | 0.832 | 17.21 | 17.193 |
| AR + 64 | 3.585 | 4.354 | 2.305 | 3.017 | 0.8347 | 18.351 | 18.328 |
| 128 | 3.536 | 4.244 | 2.401 | 2.978 | 0.8312 | 17.184 | 17.168 |
| AR + 128 | 3.61 | 4.38 | 2.361 | 3.034 | 0.8366 | 18.404 | 18.373 |
| 256 | 3.572 | 4.255 | 2.423 | 2.987 | 0.8338 | 17.273 | 17.26 |
| AR + 256 | 3.637 | 4.364 | 2.381 | 3.022 | 0.8403 | 18.593 | 18.56 |

Briefly, example embodiments of the present disclosure provide a method and system in which a general algorithm enables effective training of autoregressive speech enhancement models for low-latency applications. When implemented by a computer, such embodiments may provide considerable improvements over non-autoregressive baselines across different training losses and neural architectures.

In contrast to the related art discussed previously, embodiments of the present disclosure consider a domain-agnostic technique for improvement of low latency speech enhancement models that can be potentially used with any low-latency causal neural architectures. This disclosure demonstrates that such embodiments provide considerable improvements for time domain models in particular, although the method is not limited to a particular domain.

Although streaming low latency models may be constrained by limited future context, the sequential nature of the generation process provides them with benefits of autoregressive conditioning. Since such models process waveforms in a chunk-by-chunk manner, they may use their own predictions for previous chunks when making predictions for the current chunk. This information may then be used for more accurate modeling of clean waveform and noise suppression. For example, given a de-noised waveform from previous time steps, it is much easier for a model to understand the characteristics of noise and voice of the speaker. Indeed, although in real life a perfect ground-truth waveform is not achievable in any form, a model's predictions may serve as a proxy for a ground-truth waveform, and may thereby form an autoregressive model.

Under ideal conditions, when the model is conditioned on a ground-truth waveform from the previous time steps, it may deliver outstanding results, outperforming its non-autoregressive counterpart by a considerable margin. For example, compared to more than 15 ms algorithmic latency in the related art, which does not include autoregressive conditioning information, embodiments of the present disclosure advantageously achieved only 2 ms algorithmic latency in testing.

Typically, low latency speech enhancement models are composed of causal neural layers (e.g., uni-directional LSTMs, causal convolutions, causal attention layers, etc.) operating either in time or frequency domains. Time domain architectures also tend to include strided convolutional layers and down/upsamplings to facilitate context aggregation. In one or more embodiments of the present disclosure, these architectures may be modified to enable autoregressive conditioning. For example, additional input features containing information for autoregressive conditioning may be concatenated. In particular, for time domain architectures where the first layer is typically a uni-dimensional convolution, in addition to channel containing noisy waveform, channel containing waveform with past predictions may be included (see FIG. 2).

For most of the experiments the present inventors carried out, a simple time domain architecture, which may be called WaveUNet+LSTM, was used. The WaveUNet+LSTM model is a fully convolutional neural network, augmented at a bottleneck with a long short term memory (LSTM) layer.

FIG. 1 is a block diagram illustrating an example of a neural network model having a WaveUNet+LSTM architecture, according to an embodiment of the invention.

The architecture is based on convolutional encoder-decoder UNet architectures, having downsampling layers receiving the input (left column) and upsampling layers providing the output (right column), and is augmented with a one-directional LSTM layer at the bottleneck to enable use of large receptive field for the past time steps. The illustrated UNet structure uses strided convolutional downsampling layers with kernel size 2 and stride 2, and nearest neighbor upsampling, although other parameters are within the scope of the disclosure. Parameter K regulates an overall depth of the UNet structure, parameter N determines a number of residual blocks within each layer, and array C determines a number of channels on each level of the UNet structure. Algorithmic latency of this neural network is regulated by the number K of downsampling/upsampling layers, and is equal to $2^K$. It is noted that the illustrated architecture is not limiting, and other suitable architectures, as well as suitable modifications of the illustrated architecture, may also be used.

As previously described, teacher forcing is a very convenient way of training autoregressive models in terms of training speed. There is no need for time-consuming sequential inference (free running mode) when training in a teacher forcing regime. This is especially important for convolutional autoregressive models that can be efficiently parallelized at the training stage. Without such parallelization, it would be hard to train such models in a meaningful time. For instance, a duration of an autoregressive inference in a free running mode of a two-second audio fragment by a WaveNet model may be as much as 1000 times that of a teacher forcing inference (forward pass at the training stage) for the same fragment, even when using efficient implementation with activation caching. Using the illustrated WaveUNet+LSTM architecture, the factor may be reduced to 75, but the result is still undesirable. However, the shorter durations of teacher forcing are counterbalanced by training-inference mismatch which may lead to dramatic quality degradation, as observed in Table 1. In the related art, methods to mitigate this mismatch explicitly rely on the possibility to perform autoregressive inference in free running mode during training. As already mentioned above, forward pass in free-running mode takes orders of magnitude more time than teacher forcing, complicating usage of such techniques in practice and losing the advantage of faster processing.

Embodiments of the present disclosure provide an alternative way for diminishing the gap between training and inference, which does not require time-consuming free-running mode during training. Embodiments of the present disclosure iteratively substitute autoregressive conditioning with the model's predictions in teacher forcing mode.

Figure 2:
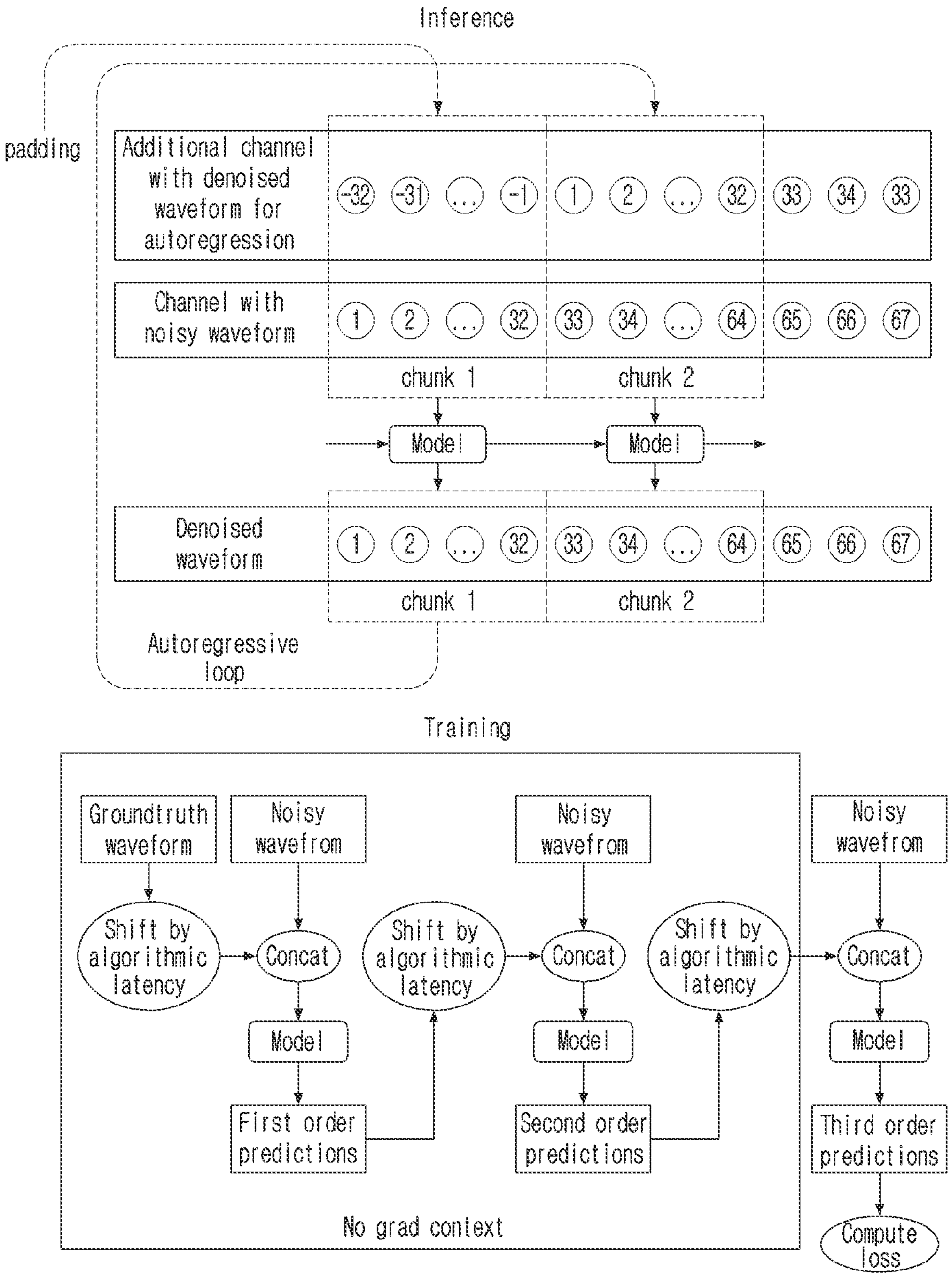
FIG. 2 illustrates conditioning and training of a neural network model, according to an embodiment of the disclosure.

FIG. 2 illustrates conditioning and training of a neural network model, according to an embodiment of the disclosure. The illustrated model has an algorithmic latency of 32 time steps (2 ms at 16 kHz sampling rate), though the disclosure is not limited thereto.

During conditioning, predicted time steps from chunk 1 may be reused in making predictions for chunk 2. Then, in training, the model may use its own predictions to propose predictions of higher orders. Ground-truth waveforms and predictions may be shifted before forming a channel with autoregressive conditioning, to avoid leakage of future information.

At the initial stage of training, the model may be trained in a standard teacher forcing mode, wherein the autoregressive channel (top row of FIG. 2) contains a ground-truth waveform (shifted as shown in FIG. 2). At the next stage, the ground-truth waveform in the autoregressive channel may be replaced by the model's predictions which were obtained in teacher forcing mode (with ground-truth as autoregressive conditioning). At each following stage or iteration of training, the autoregressive input channel may contain the model's predictions as obtained at the preceding stage. Overall, in this training procedure, the model may be conditioned on its own predictions. As the training proceeds, the order of predictions for the model to be conditioned on may be gradually increased, e.g., a number of forward passes performed before computing the loss and performing the backward pass may be increased. Note that, in embodiments of the disclosure, the gradient may be propagated through the last forward pass without also propagating in prior forward passes.

In a standard training pipeline that includes forward pass, calculating loss, backpropagation and weights optimization, embodiments of the forward pass, and more precisely a forward function of the model, will be described further. A modified iterative forward function, according to an embodiment of the disclosure, is summarized below, and schematically illustrated in the bottom half of FIG. 2.

In accordance with one or more embodiments described above, a method may comprise a model training stage and an interference stage.

The model training stage may iteratively replace autoregressive conditioning with the model's predictions in a teacher forcing mode. In a training initialization, the model may be trained in standard teacher forcing mode, in which the autoregressive channel contains a ground-truth shifted waveform. At the end of the training initialization, which may also be termed an "iteration 0" or "initial training iteration", an output of the model may be generated using the ground-truth shifted waveform as the autoregressive channel. Then, in all following iterations of a plurality of training iterations, a further output of the model may be generated using the shifted waveform outputted by the previous training iteration as the autoregressive channel. The output of a final training iteration may be used for backpropagation, without need to also use the outputs of prior iterations; for example, in some embodiments, only the output of the final iteration is backpropagated and the output of prior iterations are not.

The inference stage may provide an additional channel containing past predictions; that is, predictions outputted during the training stage. The inference stage may then perform speech enhancement using the obtained model.

An example pseudocode algorithm for the autoregressive training forward function is provided. The algorithm uses:

noisy audio x;
clean audio y;
model m, which takes x and y as inputs;
schedule {E, N} which consists of a list of integers E and a list of integers N (e.g. starting with epoch E[i], make N[i] iterations); and
integer e, which is the current epoch number.

Algorithm:

```
begin
i←0
while e>E[i] do
  i←i+1 Comment: Searching left closest to e epoch
    from E
end while
for i=0 to N[i] do with NOGRAD
  y←m(x, y) Comment: Conditioning on its own predic-
    tions end for
ŷ=m(x, y) Comment: Making final prediction
return ŷ
```

In a series of experiments, the present inventors used a batch size of 16, an Adam optimizer with learning rate 0.0002 and decay 0.999, and betas of 0.8 and 0.9. Iterative autoregressive runs were trained for 1000 epochs and non-autoregressive runs were trained for 2000 epochs, with each epoch including 1000 batch iterations. The best epoch was chosen according to validation results of the UTMOS loss metric, as this metric shows the closest correlation with MOS (Mean Opinion Score). UTMOS(UTokyo-SaruLab Mean Opinion Score) is the state-of-the-art objective speech quality metric described in: Takaaki Saeki, Detai Xin, Wataru Nakata, Tomoki Koriyama, Shinnosuke Takamichi, and Hiroshi Saruwatari, "Utmos: Utokyo-sarulab system for voicemos challenge 2022," arXiv preprint arXiv: 2204.02152, 2022.

In testing the autoregressive runs, the following schedule was used: a single iteration for the first 300 epochs, then adding an additional iteration each 100 epochs. Detailed configurations for both WaveUNet+LSTM and ConvTasNet architectures are as follows. For the main configuration of WaveUNet, the number of levels within UNet hierarchy (K) is fixed, the number of residual blocks and number of channels within residual blocks at each level to 4, 7, and 16, 24, 32, 48, 64, 96, 128, respectively. LSTM width equals 512. This configuration corresponds to 8 ms of algorithmic latency. For ConvTasNet, the original architecture implementation was used with the parameters adjusted to match the algorithmic latency to 8 ms and the number multiply-accumulate operations per second to 2 billion. these configurations are incorporated herein by reference. For most experiments, the present inventors used a voice cloning toolkit (VCTK) dataset with standard train-validation splitting.

Several series of experiments were conducted to test the idea of iterative autoregression:

1. "Motivation experiments", that revealed a problem of teacher forcing and positive effect of iterative autoregression.
2. Loss variety experiments, measuring other loss metrics such as SI-SNR and adversarial losses with L1Spec loss.
3. Testing of iterative autoregression with more challenging DNS datasets.
4. Examination of iterative autoregression with ConvTasNet architecture.
5. Experiments with different latencies to test the universality of results for embodiments of the disclosed method.

The conducted experiments consistently revealed significant improvement by the tested embodiments over baseline, thus demonstrating high practical value and versatility.

Figure 3:
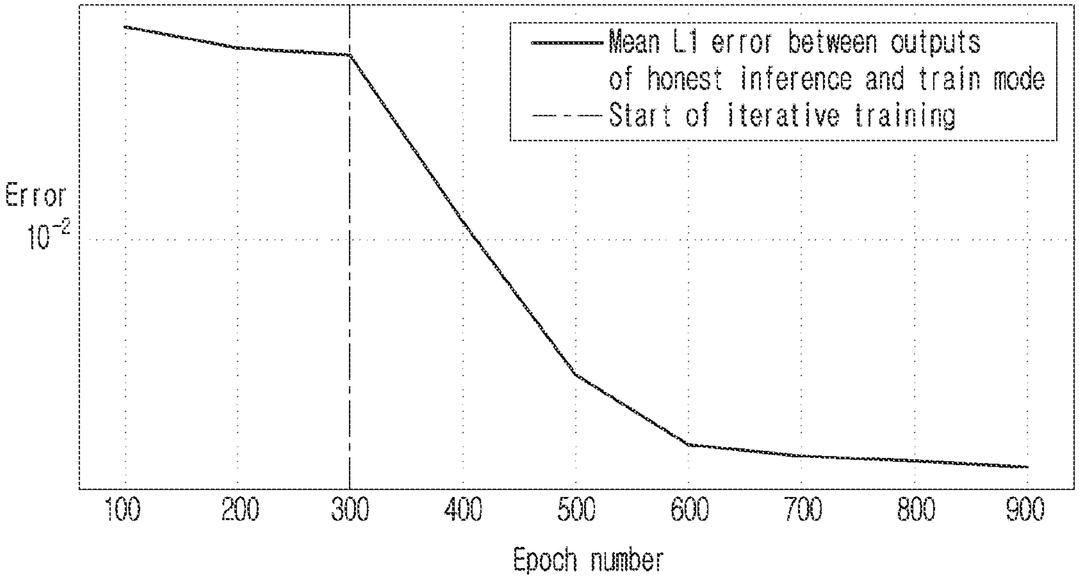
FIG. 3 is a data chart illustrating error rate reduction in an enhancement model over an iterative training process, according to an embodiment of the disclosure.

FIG. 3 is a data chart illustrating error rate reduction in an enhancement model over an iterative training process, according to an embodiment of the disclosure. In FIG. 3, the dependence of the difference between the training and test mode for the same audio data (average for 100 audio inputs) with an increasing number of iterations is illustrated. As noted above, in the illustrated experiment, additional iterations are added starting at epoch 300. It can be seen that when training using iterative autoregression, the output of training mode becomes close to the output of test mode, which enables solving of training-inference mismatch and improvement of quality without losing the speed of teacher forcing.

One or more embodiments disclosed herein may be used in various devices transmitting, receiving, and recording audio for the improvement of user experience of listening to audio (e.g. speech) recordings. For instance, example embodiments may be employed for denoising speech recorded in a noisy environment. Example embodiments may also be employed in various devices supporting floating-point or fixed-point calculations. Embodiments may be of particular interest for digital hearing aid devices, due to a strong preference for low algorithmic latency in such devices.

Embodiments of the disclosure may be executed and/or implemented on any electronic device comprising computing means, an audio playback component, and memory (RAM, ROM etc.). Some non-limiting examples of such devices include a smartphone, a tablet, earphones, sound speakers, a navigation system, in-vehicle equipment, a notebook, a smartwatch, and so on. The computing means may include, but is not limited to, a central processing unit (CPU), an audio processing unit, a processor, a neural processing unit (NPU), a graphics-processing unit (GPU). In a non-limiting embodiment, the computing means may be implemented as an application-specific integrated circuit (ASIC), a field-programmable gate array (FPGA), or as a system-on-chip (SoC). The electronic device may also comprise, without limitation, a (touch) screen, I/O means, a camera, a communication means, a speaker, a microphone, and so on.

Embodiments of the disclosure may also be implemented as a non-transitory computer-readable medium having stored thereon computer-executable instructions that, when executed by a processor of a device, cause the device to perform any step(s) and/or operations of the embodiment. Any types of data may be processed, stored and communicated by the intelligent systems trained using the above-described approaches. A learning stage may be performed online or offline. Trained neural networks may be communicated to the user device, for example, in the form of weights and other parameters, and/or computer-executable instructions, and stored thereon for being used at the inference (in-use) stage.

At least one of a plurality of modules may be implemented through an AI model. A function associated with AI may be performed through the non-volatile memory, the volatile memory, and the processor. The processor may include one or a plurality of processors. Each such processor may include, without limitation, a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors may control the processing of the input data in accordance with a predefined operating rule or artificial intelligence (AI) model stored in the non-volatile memory and the volatile memory. The predefined operating rule or artificial intelligence model is provided through training or learning. Here, being provided through training or learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks and so on.

The learning algorithm is a method for training a predetermined target device using a plurality of learning data to cause, allow, or control the target device to perform low latency speech enhancement, a determination or prediction. Examples of learning algorithms include, but are not limited to, supervised learning, unsupervised learning, semi-supervised learning, or reinforcement learning and so on.

What is claimed is:

1. A method of training and operating a neural network model, the method performed by at least one processor of an electronic device and comprising:

shifting a ground-truth waveform;

in an initial training iteration, training the neural network model in a teacher forcing mode in which an input to an autoregressive channel includes the shifted ground-truth waveform, generating predictions of the neural network model based on the shifted ground-truth waveform in the autoregressive channel and outputting the predictions of the neural network model; and in at least one additional training iteration, replacing the shifted ground-truth waveform in the autoregressive channel with the predictions of the neural network model obtained in a previous training iteration as the input to the autoregressive channel, wherein only an output of a final iteration of the at least one additional training iteration is backpropagated, wherein the neural network model is configured to perform at least one forward pass, compute a loss, and perform at least one backward pass, and wherein, during training, a number of forward passes performed before computing the loss and performing the at least one backward pass is gradually increased.

2. The method of claim 1, wherein the at least one additional training iteration comprises a plurality of training iterations, each training iteration outputting respective predictions of the neural network model to the autoregressive channel for a next iteration of the plurality of training iterations.

3. The method of claim 1, further comprising performing an inference by the neural network model by:

providing, for the neural network model, an additional channel containing at least one prediction of the neural network model outputted during training; and performing speech enhancement using the neural network model.

4. The method of claim 3, wherein the neural network model includes a fully convolutional neural network.

5. The method of claim 4, wherein the fully convolutional neural network includes a WaveUNet architecture augmented at a bottleneck thereof with a long short term memory (LSTM) layer.

6. An electronic device comprising:

at least one memory storing at least one instruction; and at least one processor configured to execute the at least one instruction to:

shift a ground-truth waveform, in an initial training iteration, train a neural network model in a teacher forcing mode in which an input of an autoregressive channel includes the shifted ground-truth waveform, generate predictions of the neural network model based on the shifted ground-truth waveform in the autoregressive channel and output the predictions of the neural network model, and in at least one additional training iteration, replace the shifted ground-truth waveform in the autoregressive channel with the predictions of the neural network model obtained a previous training iteration as the input to the autoregressive channel, wherein only an output of a final iteration of the at least one additional training iteration is backpropagated, wherein the neural network model is configured to perform at least one forward pass, compute a loss, and perform at least one backward pass, and wherein, during training, a number of forward passes performed before computing the loss and performing the at least one backward pass is gradually increased.

7. The electronic device of claim 6, wherein the at least one additional training iteration comprises a plurality of training iterations, each training iteration outputting respective predictions of the neural network model to the autoregressive channel for a next iteration of the plurality of training iterations.

8. The electronic device of claim 6, wherein the at least one processor is further configured to perform an inference by:

providing, for the neural network model, an additional channel containing at least one prediction of the neural network model outputted during training, and performing speech enhancement using the neural network model.

9. The electronic device of claim 8, wherein the neural network model includes a fully convolutional neural network.

10. The electronic device of claim 9, wherein the fully convolutional neural network includes a WaveUNet architecture augmented at a bottleneck thereof with a long short term memory (LSTM) layer.

11. A non-transitory computer-readable recording medium having instructions stored thereon which, when executed by at least one processor, cause the at least one processor to:

shift a ground-truth waveform, in an initial training iteration, train a neural network model in a teacher forcing mode in which an input of an autoregressive channel includes the shifted ground-truth waveform, generate predictions of the neural network model based on the shifted ground-truth waveform in the autoregressive channel and output the predictions of the neural network model; and in at least one additional training iteration, replace the shifted ground-truth waveform in the autoregressive channel with the predictions of the neural network model obtained a previous training iteration as the input to the autoregressive channel, wherein only an output of a final iteration of the at least one additional training iteration is backpropagated, wherein the neural network model is configured to perform at least one forward pass, compute a loss, and perform at least one backward pass, and wherein, during training, a number of forward passes performed before computing the loss and performing the at least one backward pass is gradually increased.

12. The non-transitory computer-readable recording medium of claim 11, wherein the at least one additional training iteration comprises a plurality of training iterations, each training iteration outputting respective predictions of the neural network model to the autoregressive channel for a next iteration of the plurality of training iterations.

13. The non-transitory computer-readable recording medium of claim 12, wherein the instructions further cause the at least one processor to perform an inference by:

providing, for the neural network model, an additional channel containing at least one prediction of the neural network model outputted during training, and performing speech enhancement using the neural network model.

14. The non-transitory computer-readable recording medium of claim 13, wherein the neural network model includes a fully convolutional neural network.

15. The non-transitory computer-readable recording medium of claim 14, wherein the fully convolutional neural network includes a WaveUNet architecture augmented at a bottleneck thereof with a long short term memory (LSTM) layer.

* * * * *